(12) United States Patent
Naito et al.

(10) Patent No.: US 7,323,799 B2
(45) Date of Patent: Jan. 29, 2008

(54) AXIAL GAP TYPE ROTATING ELECTRIC MACHINE

(75) Inventors: Shinya Naito, Shizuoka (JP); Haruyoshi Hino, Shizuoka (JP)

(73) Assignee: Yamaha Hatsudoki Kabushiki Kaisha, Shizuoka-Ken (JP)

( * ) Notice: Subject to any disclaimer, the term of this patent is extended or adjusted under 35 U.S.C. 154(b) by 269 days.

(21) Appl. No.: 10/496,987

(22) PCT Filed: Nov. 29, 2002

(86) PCT No.: PCT/JP02/12499

§ 371 (c)(1), (2), (4) Date: May 27, 2004

(87) PCT Pub. No.: WO03/047069

PCT Pub. Date: Jun. 5, 2003

(65) Prior Publication Data

US 2005/0017596 A1  Jan. 27, 2005

(30) Foreign Application Priority Data

Nov. 29, 2001 (JP) .............................. 2001-363604

(51) Int. Cl.
*H02K 1/06* (2006.01)
(52) U.S. Cl. ...................... 310/218; 310/216; 310/268
(58) Field of Classification Search ................ 310/268, 310/254, 216–218, 258, 259
See application file for complete search history.

(56) References Cited

U.S. PATENT DOCUMENTS

| | | | | |
|---|---|---|---|---|
| 2,573,283 A | * | 10/1951 | Seitz ............................ | 318/832 |
| 3,567,978 A | * | 3/1971 | Parker ........................ | 310/124 |
| 3,699,372 A | * | 10/1972 | Abe et al. .................... | 310/268 |
| 4,095,150 A | * | 6/1978 | Senckel ........................ | 310/12 |
| 4,835,839 A | * | 6/1989 | Forbes et al. ................. | 29/596 |
| 4,959,578 A | * | 9/1990 | Varga .......................... | 310/268 |
| 5,214,337 A | * | 5/1993 | Ishibashi ..................... | 310/268 |

(Continued)

FOREIGN PATENT DOCUMENTS

EP        1418657 A1  *  5/2004

(Continued)

*Primary Examiner*—Dang Le
(74) *Attorney, Agent, or Firm*—Hogan & Hartson LLP

(57) ABSTRACT

There is provided an axial gap type rotating electric machine which is small-sized and achieves a high motor efficiency as a drive source having a high torque using a strong magnet by reducing energy loss by an induced current. An axial gap type rotating electric machine having a yoke on a side of a rotor in a circular plate shape fixed to a rotating shaft, a yoke 23 on a side of a stator in a circular plate shape opposed to the yoke on the side of the rotor, a magnet fixed to a side of an opposed face of either one of the yokes on the side of the rotor or the side of the stator, a plurality of teeth 24 arranged on a side of an opposed face of other yoke on the side of the rotor or the side of the stator radially and oppositely to the magnet, and a coil 25 wound around each of the plurality of teeth, in which the yoke 23 has a fixing portion including a hole or a recess for inserting a portion Of the teeth to fix, and in which a resistance portion against an induced current (slit 36)is provided at a surrounding of the fixing portion.

16 Claims, 13 Drawing Sheets

U.S. PATENT DOCUMENTS

| | | | | |
|---|---|---|---|---|
| 5,519,270 | A | * | 5/1996 | Yamada et al. ............ 310/67 R |
| 5,918,360 | A | * | 7/1999 | Forbes et al. .................. 29/596 |
| 6,157,112 | A | * | 12/2000 | Suzuki et al. ................ 310/269 |
| 6,445,105 | B1 | * | 9/2002 | Kliman et al. ............... 310/268 |
| 6,707,221 | B2 | * | 3/2004 | Carl ............................ 310/254 |
| 6,809,453 | B2 | * | 10/2004 | Narita et al. ................. 310/216 |
| 2002/0067091 | A1 | * | 6/2002 | Kliman et al. ......... 310/156.01 |

FOREIGN PATENT DOCUMENTS

| | | | |
|---|---|---|---|
| JP | 48-95107 | | 11/1973 |
| JP | 48-97002 | | 12/1973 |
| JP | 56-86843 | | 7/1981 |
| JP | 61-106053 | | 5/1986 |
| JP | 01-016243 | | 1/1989 |
| JP | 01019950 A | * | 1/1989 |
| JP | 3-86051 | | 4/1991 |
| JP | 11-018348 | | 1/1999 |
| JP | 11055907 A | * | 2/1999 |
| JP | 2000253635 A | * | 9/2000 |
| JP | 2001-54270 | | 2/2001 |
| JP | 1 128 524 | | 8/2001 |
| JP | 2003079120 A | * | 3/2003 |
| JP | 2004056860 A | * | 2/2004 |
| WO | WO 03012956 A1 | * | 2/2003 |
| WO | WO 03047069 A1 | * | 6/2003 |
| WO | WO 03047070 | * | 6/2003 |

* cited by examiner

37: TEETH PRESS FIT HOLE

AXIAL GAP TYPE ROTATING ELECTRIC MACHINE

TECHNICAL FIELD

The present invention relates to a rotating electric machine having a rotor and a stator constituting an electric motor, a generator or the like and utilizing both operation of a motor and a generator as a regenerative brake when the rotating electric machine is used as a drive source of a vehicle.

BACKGROUND ART

A radial gap type electric motor is used as a general electric motor of a drive source or the like of an electric two-wheeled vehicle or the like. The radial gap type electric motor is provided with a magnet around an axis in a cylindrical shape on a side of, for example, a rotor, and provided with a plurality of teeth opposed to a cylindrical face of the magnet on a side of a stator and wound with coils around the teeth. Therefore, a gap between opposed faces of the magnet and the respective teeth is formed in a cylindrical shape along the axis.

Meanwhile, an axial gap type electric motor is used as a rotation drive source of an audio apparatus or the like having a comparatively small output. The axial gap type electric motor is constituted by a yoke on a side of a rotor in a circular plate shape fixed to a rotating shaft, a yoke on a side of a stator in a circular plate shape opposed to the yoke on the side of the rotor, a magnet fixed to a side of an opposed face of the yoke of either one yoke on the side of the rotor or the side of the stator, a plurality of teeth arranged on the side of an opposed face of other yoke on the side of the rotor or the side of the stator radially and opposedly to the magnet and coils wound around respective teeth. Therefore, a gap between the opposed faces of the magnet and the teeth is formed in a planar shape orthogonal to an axis.

FIG. 17 is an explanatory view of a magnetic flux of an axial gap type electric motor of a background art. The drawing shows a magnetic flux only with respect to one tooth 3 and illustration thereof is omitted with respect to left and right contiguous teeth 3.

The stator 1 is provided with a stator yoke 2 in a circular plate shape having a laminated member of steel plates and a plurality of teeth 3 each similarly having a laminated member of steel plates which are arranged radially above the stator yoke 2. Each tooth 3 is wound with a coil (not illustrated). A rotor (not illustrated) in a circular plate shape is arranged oppositely to the teeth 3 of the stator. A magnet is fixed to the rotor at a predetermined gap from upper faces of the teeth 3. Incidentally, the circular plate shape includes a circular shape and a planar ring shape (doughnut shape).

A magnetic circuit is formed between the rotor, not illustrated, and the stator, and a magnetic flux coming out from an N pole of the magnet is made to flow to the tooth 3 and to the stator yoke 2 (arrow A) and flow to an S pole (not illustrated) of the magnet by passing other teeth 3. By energizing the coil, the tooth of that coil is excited to attract and repulse the magnet of the rotor opposed to an upper face of the tooth. By successively switching energization of the coil, the excited teeth are successively moved and the rotor is rotated along with the magnet.

According to such an axial gap type motor, opposed faces of the magnet and the teeth are orthogonal to an axial direction and therefore, a length in the axial direction becomes shorter than that of the radial gap type. Also in the case of increasing an output, the opposed faces opposed to each other via the gap can be increased without prolonging the length in the axial direction and therefore, the constitution can contribute to thin formation of the motor.

However, according to the above-described axial gap type electric motor, by energizing the coil, the magnetic flux flowing from the tooth 3 to the stator yoke 2 is changed in a direction and a magnitude thereof since the magnet on the side of the rotor is rotated and by electromagnetic induction in accordance with an amount of the change, an induced current B in an eddy shape is made to flow at inside of the stator yoke 2 centering on the tooth 3 at a surrounding thereof (FIG. 17). The induced current B becomes Joule's heat to constitute loss of energy and the motor efficiency is reduced.

Although the loss of energy by the heat does not cause a serious problem in the case of a low output, when a strong magnet is used for achieving a large torque as in, for example, an electric two-wheeled vehicle, the loss is significantly increased and also a temperature rise rate is increased to bring about high temperatures.

Therefore, although such an axial gap type electric motor is of a thin type and regarded to be preferable to mount to an axle or the like of an electric two-wheeled vehicle, the motor efficiency is significantly reduced in the case of the electric two-wheeled vehicle having a high torque and using a strong magnet and therefore, the axial gap type electric motor is not applied as the drive source.

The invention takes a consideration of the above-described background art and it is an object thereof to provide an axial gap type electric motor which is small-sized and achieves a high motor efficiency as a drive source having a high torque using a strong magnet by reducing energy loss by an induced current.

DISCLOSURE OF THE INVENTION

In order to achieve the above-described object, the invention provides an axial gap type rotating electric machine, including: a yoke on a side of a rotor in a circular plate shape fixed to a rotating shaft; a yoke on a side of a stator in a circular plate shape opposed to the yoke on the side of the rotor; a magnet fixed to a side of an opposed face of either one of the yokes on the side of the rotor or the side of the stator; a plurality of teeth arranged on a side of an opposed face of other yoke on the side of the rotor or the side of the stator radially and oppositely to the magnet; and a coil wound around each of the plurality of teeth; wherein the yoke comprises a fixing portion including a hole or a recess for inserting a portion of the teeth to fix; and wherein a resistance portion against an induced current is provided at a surrounding of the fixing portion.

According to the constitution, in the case of an induced current generated in an eddy shape at a surrounding of the teeth at inside of the stator yoke based on a change in a magnetic flux passing the teeth, the induced current is blocked or reduced by forming the resistance portion against the induced current of a slit or the like constituted by, for example, cutting the yoke at the surrounding of the teeth. Therefore, an energy loss is reduced and a high motor efficiency is achieved.

Incidentally, the hole or the recess for fixing the teeth formed at the yoke may be for, for example, press-fitting or may be for simply inserting or fitting the teeth and fixing the teeth by other means of a screw or solder or the like. Further, the teeth may be fixedly bonded by sealing the teeth by a resin or the like. The hole penetrates the yoke in a plate thickness direction and the recess does not penetrate. In the case of the through hole, the yoke is formed by laminating steel plates all of which are perforated. In the case of the recess, the yoke is formed by laminating the perforated steel plates and laminating the steel plates which are not perforated there below. That is, the recess is formed with the through hole to a middle of a plate thickness of the yoke.

A preferable constitution example is characterized in that the resistance portion is formed by a space portion provided at the yoke or cutting the yoke.

According to the constitution, the induced current is reduced by interposing an air layer by cutting the yoke or forming the space portion at a portion of the yoke at which the induced current is made to flow. The cutting is formed by a shape separating the yoke in a state in which a gap is hardly present. A shape of the space portion may be a shape of a slit having a thin width or can be constituted by a pertinent shape of an elliptical shape or the like.

Another preferable constitution example is characterized in that the resistance portion is formed by a member made of a material that is different from a material of the yoke.

According to the constitution, for example, the cutting or the slit is formed at the portion of the yoke at which the induced current is made to flow, an insulating film is mounted thereto or a resin is filled thereto to thereby reduce the induced current. Or, the induced current may be reduced by providing an insulating property by denaturing the portion at which the induced current is made to flow by a treatment of a chemical treatment, a laser treatment or the like.

Another preferable constitution example is characterized in that the resistance portion is formed on an inner peripheral side or an outer peripheral side of the fixing portion.

According to the constitution, the induced current is reduced by forming the resistance portion of the cutting, the slit or the like on the inner peripheral side or the outer peripheral side of the fixing portion having a plurality of the holes or the recesses provided in a ring-like shape at the yoke in the circular plate shape. In this case, the resistance portions may be formed on the inner peripheral side or the outer peripheral side unifiedly for all of the fixing portions or may be formed alternately on the inner peripheral side and the outer peripheral side or at every plurality of pieces thereof.

Another preferable constitution example is characterized in that the resistance portion is formed between the fixing portions contiguous to each other.

According to the constitution, the induced current is reduced by forming the resistance portion of the cutting, the slit or the like at the fixing portion having a plurality of the holes or the recesses provided in a ring-like shape at the yoke in the circular plate shape between the contiguous fixing portions.

For example, with respect to a plurality of the teeth arranged by being aligned in the ring-like shape, by forming slits by cutting the yoke between the contiguous teeth along the circumferential direction, an influence on the magnetic flux flowing in the circumferential direction at inside of the yoke can be minimized. In this case, by forming the slit in the circumferential direction by connecting the holes of the teeth by constituting one set of the teeth in correspondence with 360° in an electric angle, the induced current can efficiently be blocked and the motor efficiency can be increased.

Another preferable constitution example is characterized in that the resistance portion is formed without reaching the fixing portion and the yoke at a peripheral edge of the fixing portion is brought into a continuous state.

According to the constitution, the resistance portion by the cutting, the slit or the like is not opened to a peripheral edge of the hole or the recess of the fixing portion and therefore, in press-fitting the teeth to the fixing portion, deformation of the yoke is restrained and the teeth can solidly and fixedly be held and a highly accurate gap interval is maintained between the magnet and the teeth.

Another preferable constitution example is characterized in that the resistance portion is not formed totally from one face to other face with respect to a direction of a plate thickness of the yoke and either of a side of the one face or a middle portion is not formed with respect to a direction of a plate thickness of the yoke.

According to the constitution, the resistance portion by the cutting, the slit or the like is not formed over the total of the plate thickness of the yoke and therefore, when the teeth are press-fit to the fixing portion, deformation of the yoke is restrained and the teeth can solidly be held fixedly thereto and a highly accurate gap interval is maintained between the magnet and the teeth.

Another preferable constitution example is characterized in that the yoke fixed with the teeth is sealed by a resin mold.

According to the invention, the teeth can firmly be held fixedly by solidifying the yoke mounted with the teeth by the resin. Further, when the yoke is deformed by press-fitting the teeth to the yoke, by setting the yoke to a die in a state of correcting the deformation and making the resin flow thereto in molding, the yoke having highly accurate dimension and shape can be provided.

According to a preferable application example, an axial gap type electric motor of the invention is used as drive source of an electric two-wheeled vehicle.

According to the application example, by using the electric motor of the invention as the drive source of the electric two-wheeled vehicle having a high torque using a strong magnet, the motor efficiency can be increased by restraining energy loss by restraining the induced current, the battery running distance can be prolonged and overheating can be restrained. Further, since thin formation in the axial direction is achieved, when attached to an axle, the electric motor can compactly be mounted in the vehicle width direction and large output is provided by the compact shape.

BEST MODE FOR CARRYING OUT THE INVENTION

A description will be given of embodiments of the invention with reference to the drawings as follows.

Figure 1:
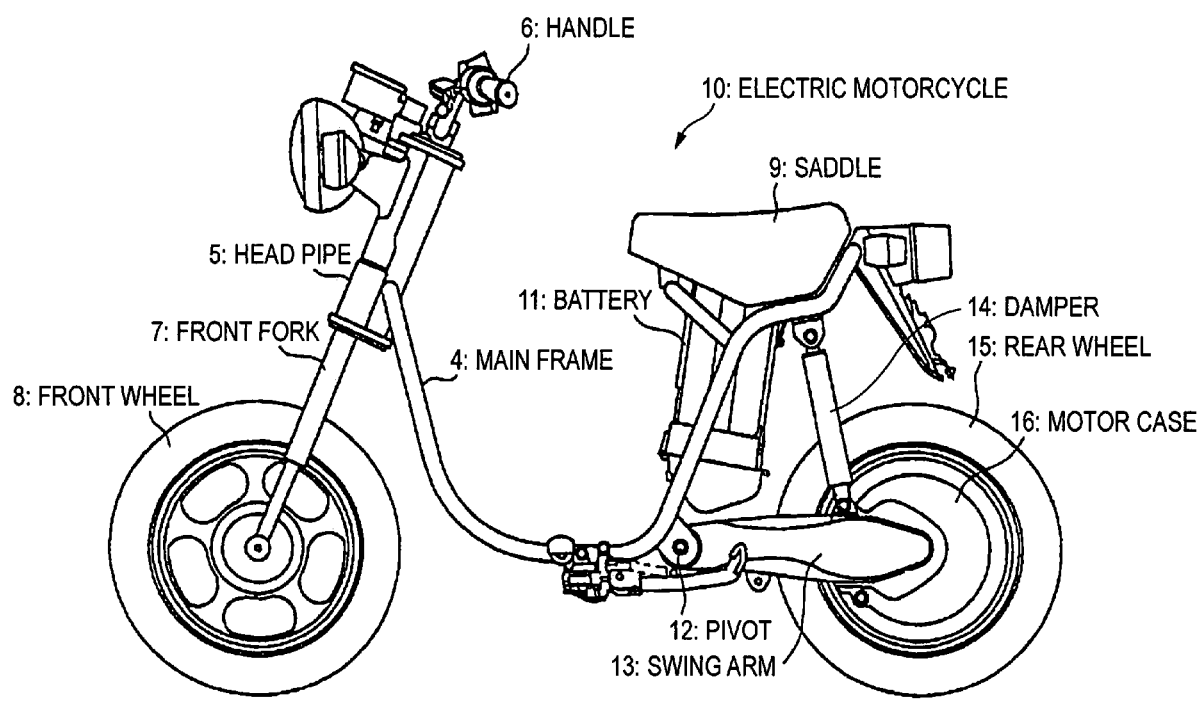
FIG. 1 is a side view of an electric two-wheeled vehicle to which the invention is applied.

FIG. 1 is a side view of an electric two-wheeled vehicle to which an axial gap type electric motor of the invention is applied.

The electric two-wheeled vehicle 10 is mounted with a steering shaft (not illustrated) of a handle 6 which is inserted to a head pipe 5 fixedly attached to a front end of a main frame 4 and supports a front wheel 8 via a front fork 7 connected thereto. A saddle 9 is provided at a central portion of a vehicle body and a battery 11 is fixed to the main frame 4 on a lower side of the saddle. A swing arm 13 is pivotably supported by way of a pivot 12 via a damper 14 from a central portion to a rear side of the main frame 4. A motor case 16 is integrally formed at a rear end portion on the swing arm 13. An axial gap type electric motor according to the invention, mentioned later, is mounted to inside of the motor case 16 along with an axle (not illustrated) of a rear wheel 15 and coaxially with the axle.

Figure 2:
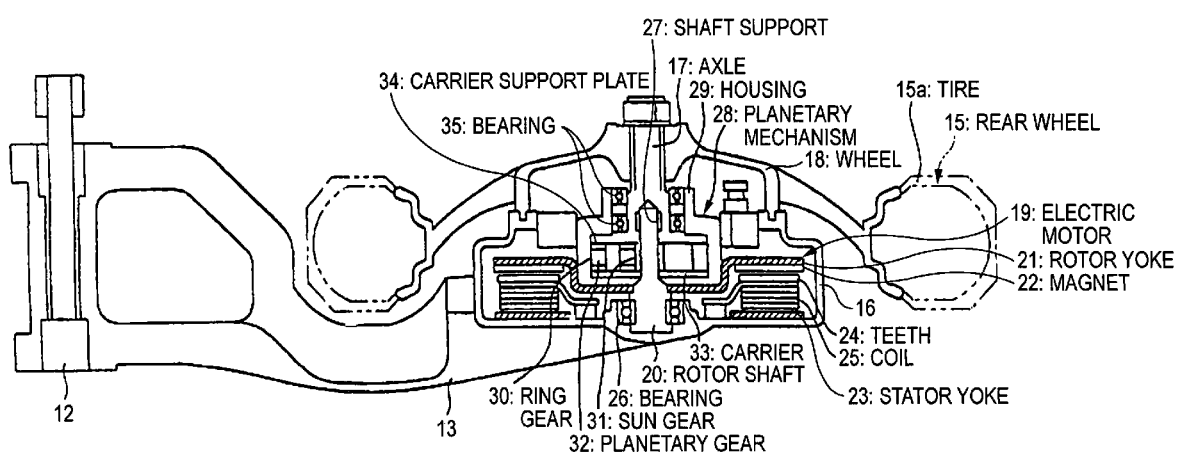
FIG. 2 is a diagram of a rear wheel portion of the electric two-wheeled vehicle of FIG. 1.

FIG. 2 is a diagram of an essential portion of a rear wheel portion of the electric two-wheeled vehicle.

A tire 15a of the rear wheel 15 is mounted with a wheel 18 fixed to an axle 17. An electric motor 19 of an axial gap type is mounted to inside of the motor case 16 integral with the swing arm 13. The electric motor 19 is constituted by a rotor shaft 20, a rotor yoke 21 fixed to the rotor shaft 20, a magnet 22 fixed to the rotor yoke 21, a stator yoke 23 fixed to the motor case 16, a plurality of teeth 24 fixed to the stator yoke 23 by being aligned radially and oppositely to the magnet 22, and a coil 25 wound around each of the teeth 24.

One end portion of the rotor 20 is rotatably supported by the motor case 16 via a bearing 26 and other end thereof is rotatably supported by the axle 17 via a shaft support 27. The rotor shaft 20 is connected to the axle 17 via a planetary mechanism 28. The planetary mechanism 28 per se is publicly known and constituted by a cylindrical housing 29, a ring gear 30 provided at an inner face of the housing 29, a sun gear 31 provided at the rotor shaft 20, a planetary gear 32 rotated and revolved by being brought in mesh with the sun gear 31 and the ring gear 30, a carrier 33 supporting the planetary gear 32 and a carrier support plate 34 supporting the carrier 33 and integral with the axle 17. The axle 17 is rotatably attached to the housing 29 via a bearing 35.

Figure 3:
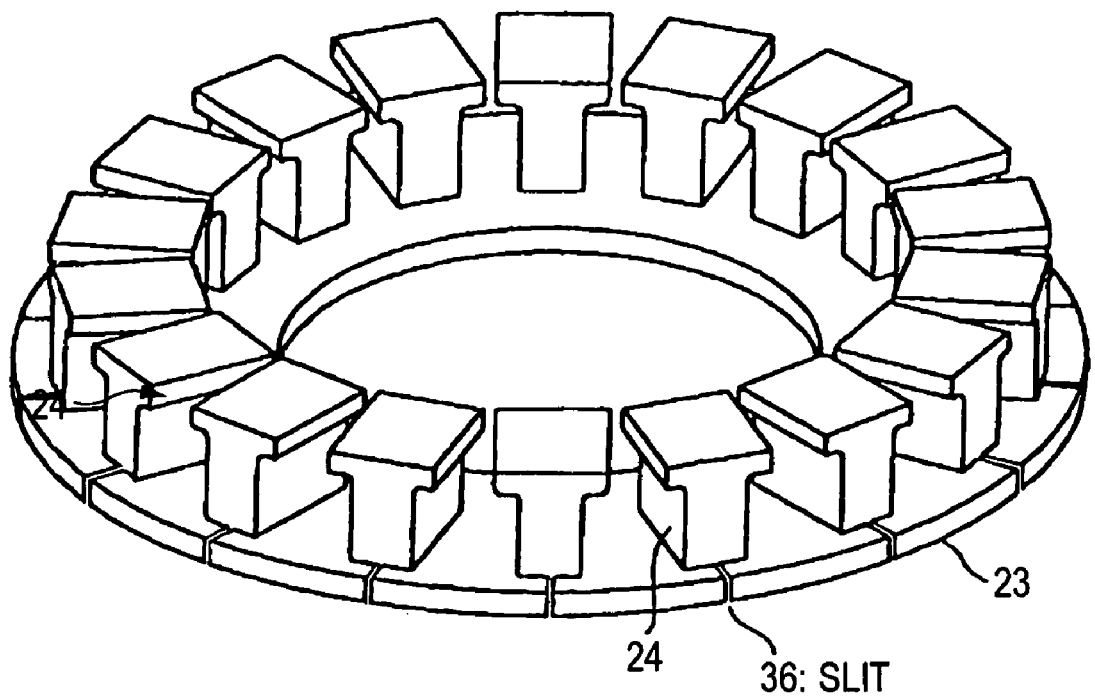
FIG. 3 is a perspective view of a constitution of an essential portion of a stator according to an embodiment of the invention.

FIG. 3 is a diagram of an essential portion of a stator portion of an axial gap type electric motor according to the invention.

Figure 11:
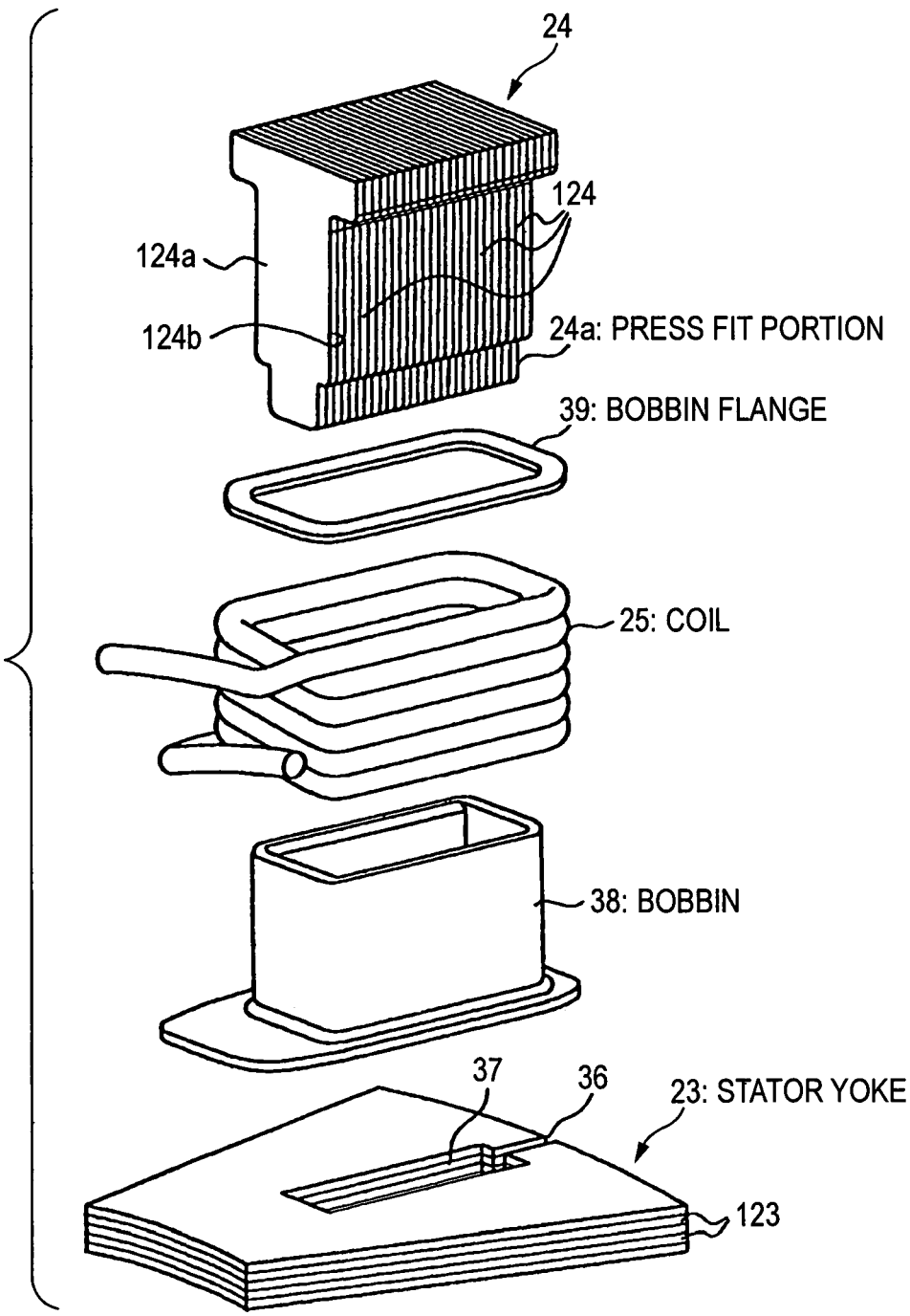
FIG. 11 is an exploded view of a stator according to an embodiment of the invention.

A plurality of the teeth 24 each having a laminated member of steel plates are radially arranged above the stator yoke 23 in a circular plate shape (doughnut shape) having a laminated member of steel plates and is, for example, fixedly press-fit thereto. As shown in FIG. 11, mentioned later, the stator yoke 23 is formed by laminating plate members 123 for the yoke constituted by punching steel plates (in a doughnut shape as shown in FIG. 3 in this example). Further, as shown in FIG. 11, the teeth 24 is formed by laminating plate members 124 for the teeth constituted by punching steel plates.

The plate members 124 for the teeth are laminated by superposing front and rear plate faces 124a. A side face 124b in correspondence with a plate thickness of a steel plate is exposed to a side face of the tooth 24 which is the laminated member. According to the example, a laminating direction is a radius direction (radial direction) and the tooth 24 is fixedly press-fit to the yoke 23 such that a direction of the plate face 124a constituting the face to be superposed becomes a circumferential direction.

The coil 25 (FIG. 2) is wound around each tooth 24. As shown in FIG. 2, mentioned above, the magnet 22 fixed to the rotor yoke 21 in the circular plate shape is arranged opposedly to the teeth 24 with a predetermined gap therebetween. According to the embodiment, a slit 36 is formed by cutting the stator yoke 23 on an outer peripheral side of each tooth 24.

Figure 4:
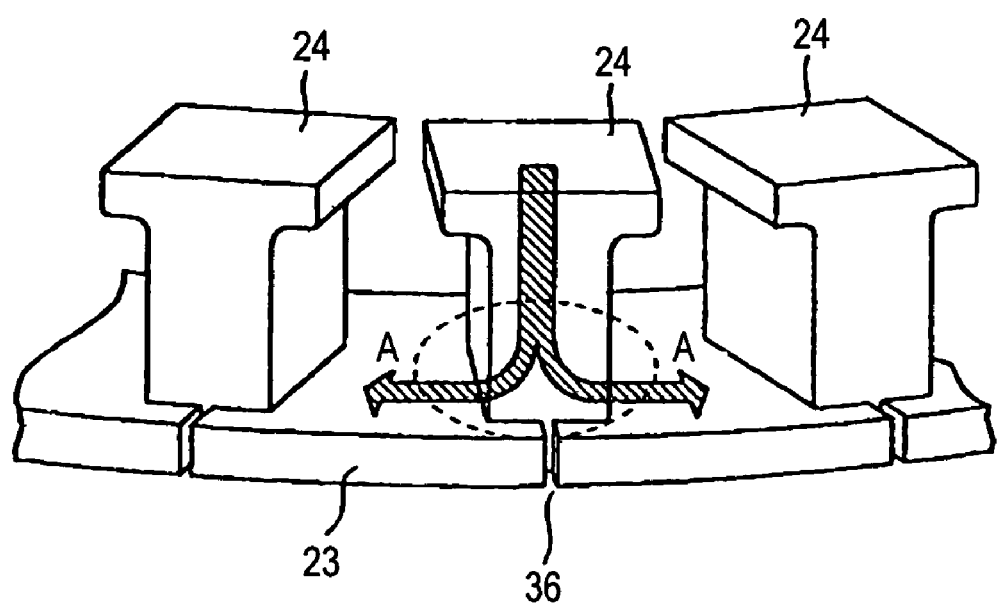
FIG. 4 is an explanatory view of operation of the embodiment of the invention.

FIG. 4 is an explanatory view of operation of the slit provided at the stator yoke.

Figure 17:
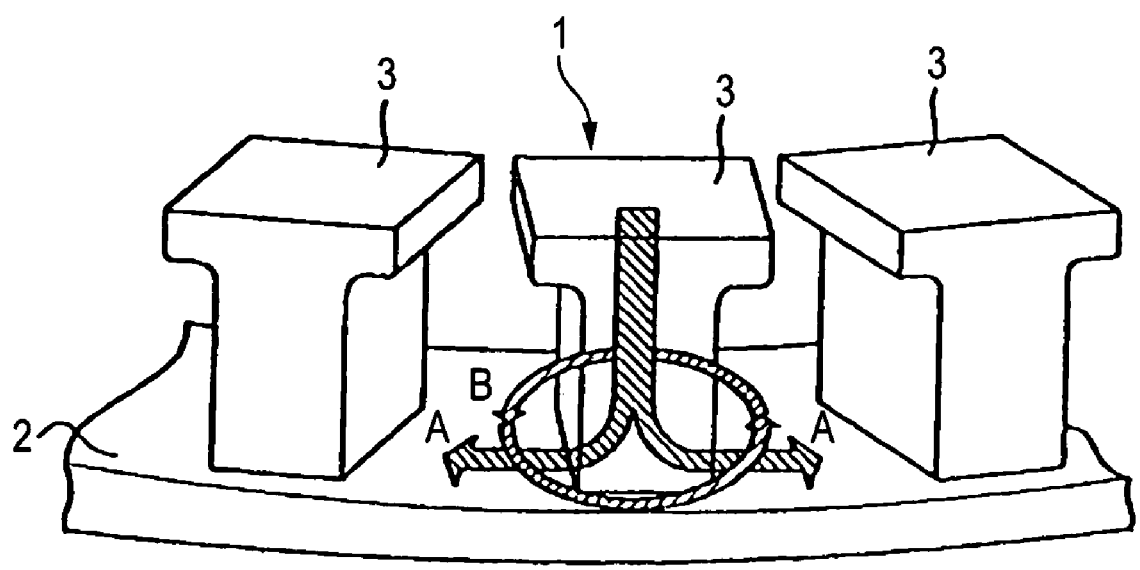
FIG. 17 is an explanatory view of an induced current in a stator of a background art.

By energizing the coil (not illustrated) wound around each tooth 24, the tooth 24 of the coil is excited to attract and repulse the magnet of the rotor (not illustrated) opposed to an upper face of the tooth. By successively switching the excited coil, the rotor is made to rotate by successively attracting and repulsing the magnet. At this occasion, a magnetic flux is made to flow from a side of the magnet to the teeth 24 and a magnetic path is formed by passing the magnet, the predetermined tooth 24 and the stator yoke 23. The magnetic flux forming the magnetic path is made to flow from the predetermined tooth 24 by passing the stator yoke 23 as shown by an arrow A. As explained with reference to FIG. 17, an induced current is generated at inside of the stator yoke 23 at a surrounding of the tooth 24 (at a position of a dotted line in the drawing). However, according to the embodiment, the slit 36 for constituting an insulating layer is formed at the stator yoke 23 on an outer peripheral side of a press fit portion of a root portion of each tooth 24 and therefore, an induced current is blocked and substantially, the induced current does not flow.

That is, the slit 36 constitutes a resistance portion against the induced current and the induced current is blocked or reduced. The resistance portion is not limited to a slit having a slender interval but may be formed by a space portion of a cut having almost no interval or a hole having other shape or the like. Further, an insulating film may be interposed or an insulating agent of a resin or the like may be filled therein. Or, the induced current may be reduced by providing an insulating property by denaturing a portion at which the induced current flows by a treatment of a chemical treatment, a laser treatment or the like.

Figure 5:
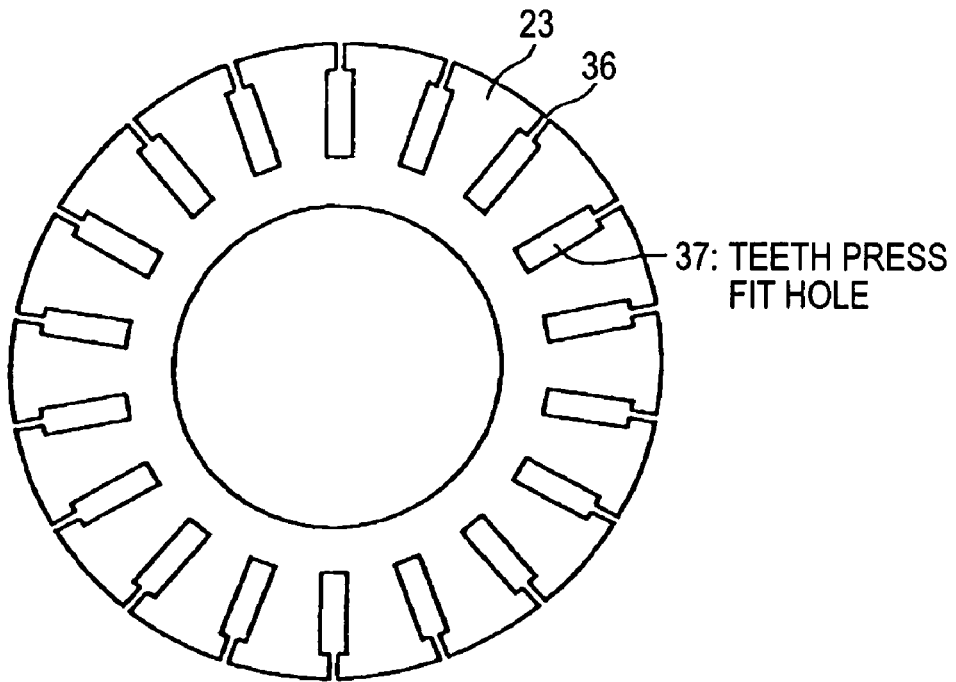
FIG. 5 is a plane view of a stator yoke of the embodiment of the invention.

FIG. 5 is a plane view of the stator yoke according to the embodiment of the invention.

The stator yoke 23 in the ring-like shape is formed to be penetrated by a plurality of teeth press fit holes 37. The slit 36 opened to an outer peripheral side of each press fit hole 37 is formed by cutting the stator yoke 23.

The press fit hole 37 is a fixing portion for inserting a portion of the tooth (press fit portion 24a in FIG. 11) to fix to the yoke. The fixing portion may be a hole penetrating the yoke 23 in a plate thickness direction as shown in FIG. 9(A), mentioned later, or may be recess which does not penetrate there through but formed with a hole to a middle thereof as shown in FIG. 9(C).

Figure 6:
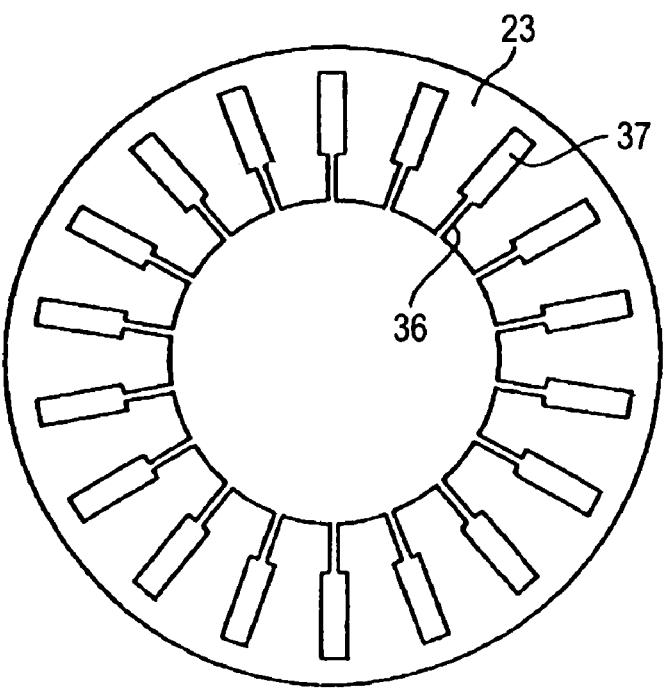
FIG. 6 is a plane view of a stator yoke according to another embodiment of the invention.

FIG. 6 is a plane view of a stator yoke according to another embodiment of the invention.

The embodiment is formed with a slit 36 by cutting an inner peripheral side of each teeth press fit hole 37 formed at a stator yoke 23. Even when the inner peripheral side of each teeth press fit hole 37 is cut in this way, similar to the example of FIG. 5, the induced current can be blocked.

Figure 7:
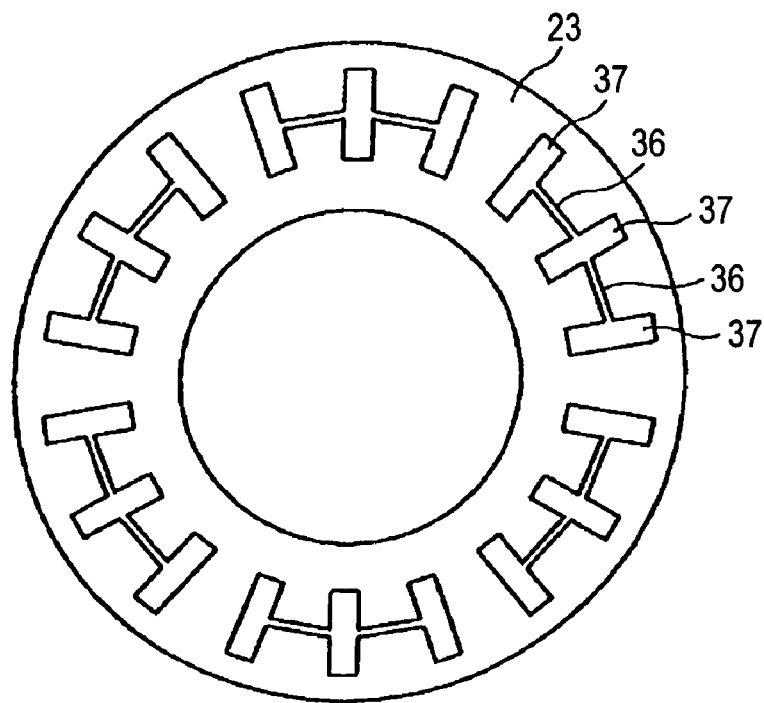
FIG. 7 is a plane view of a stator yoke according to still another embodiment of the invention.

FIG. 7 is a plane view of a stator yoke according to still another embodiment of the invention.

The embodiment is formed with a slit 36 in a circular arc shape or a linear shape by communicating central portions in a radial direction of teeth press fit holes 37 contiguous to each other. In this way, the slit 36 is formed along a circumferential direction (a direction orthogonal to the radial direction) of a stator yoke 23. By the slit 36, an induced current formed at a surrounding of the press fit hole fixed with the tooth can be blocked or reduced.

In this case, the induced current can effectively be restrained from being generated by forming the slit 36 by connecting a set of the teeth 24 constituting 360° in an electrical angle. The example of FIG. 7 is an example of forming an electrical angle of 360° by three pieces of contiguous teeth 24 (U phase, V phase, W phase) in a motor having 18 slots and 12 poles and the slit 36 is formed by connecting the central portions in the radial direction of the respective teeth press fit holes 37 at every three pieces of the teeth press fit holes 37 contiguous to each other. Further, a position of the slit 36 may also be other than the central portion.

Figure 8:
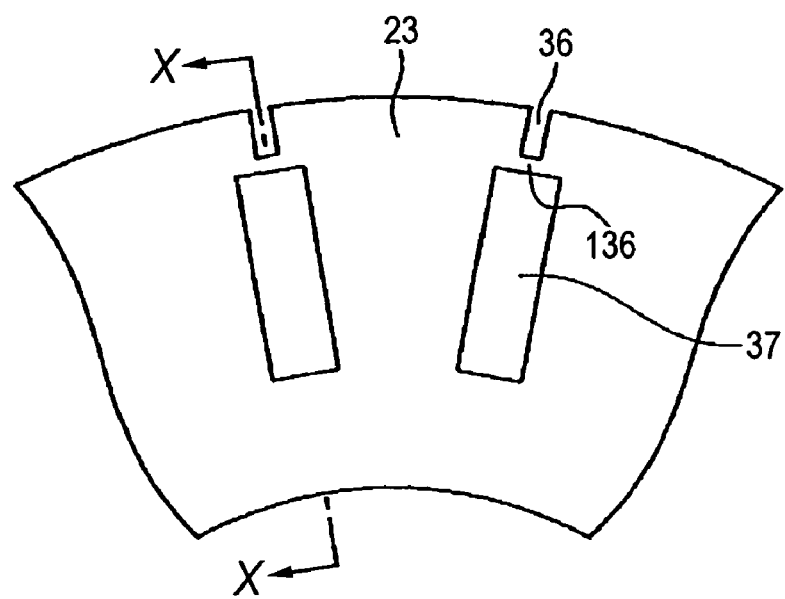
FIG. 8 is a shape explanatory view of still another embodiment of the invention.

FIG. 8 is an explanatory view of a shape of still another embodiment of the invention.

The embodiment is formed with a connecting portion 136 at an end portion of a slit such that a peripheral edge of teeth press fit hole 37 is brought into a continuous state without opening the slit 36 to the teeth press fit hole 37 but cutting the slit 36 before the teeth press fit hole. Thereby, not only the induced current is reduced but also deformation of the stator yoke and reduction in a force to hold the press-fitting teeth by forming the slit 36 can be prevented. Further, although the example of drawing shows an example of applying to the embodiment of FIG. 5 formed with the slit 36 on an outer peripheral side of the tooth, also with regard to the examples of FIG. 6 and FIG. 7, similarly, the slit 36 maybe formed without opening the slit 36 to the teeth press fit hole 37 but in a state of making the peripheral edge of the teeth press fit hole 37 continuous.

Figure 9:
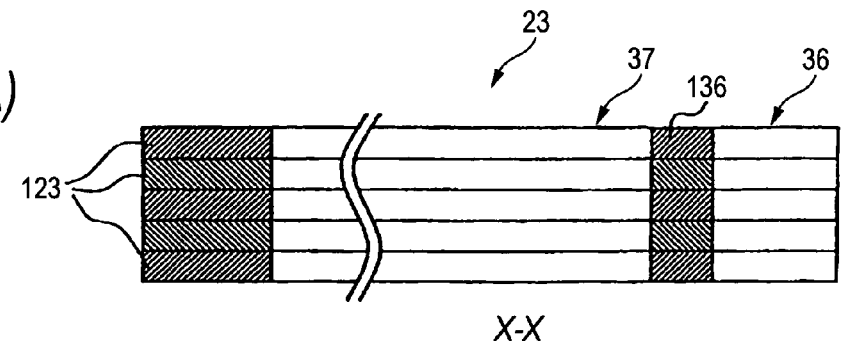
FIG. 9 illustrates sectional views of a stator yoke.
Figure 9:
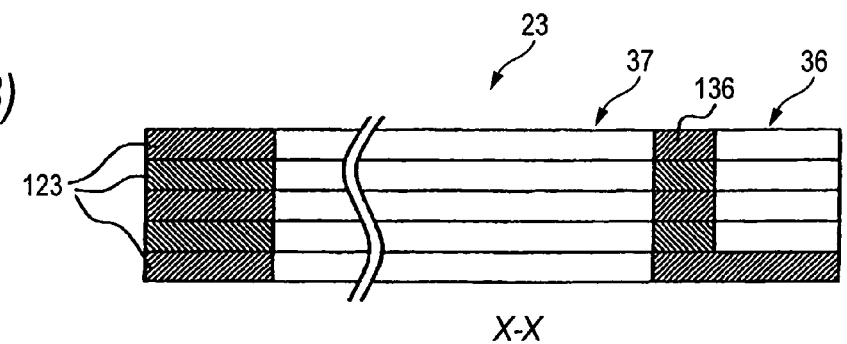
Figure 9:
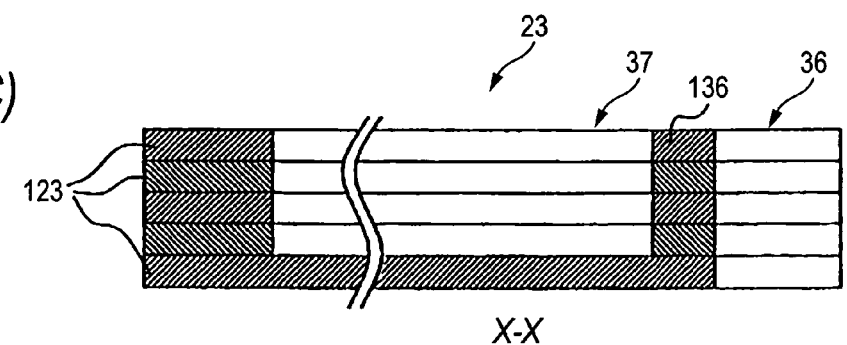

FIG. 9 illustrates sectional views of a portion of the yoke 23 taken along a line X-X of FIG. 8.

As shown in FIG. 9(A), the stator yoke 23 is the laminated member of the plate members 123 for the yoke and the connecting portion 136 is formed between the press fit hole 37 and the slit 36.

FIG. 9(B) is a modified example of FIG. 9(A) and is an example in which the slit 36 is not penetrated in the plate thickness direction of the yoke 23 but is formed to a middle thereof. According to the example, the lowermost plate member 123 of the yoke is not formed with an opening for the slit. In this way, by providing a portion in which the slit is not formed also in the plate thickness direction of the yoke along with the connecting portion 136, an effect of preventing deformation of the yoke is increased.

FIG. 9(C) shows the press fit hole 37 in a shape of a recess in which the press fit hole 37 is not penetrated in the plate thickness direction of the yoke 23 but is formed to a middle thereof. According to the example, the lowermost plate member 113 of the yoke is not formed with the press fit hole 37.

FIG. 10(A) through 10(G) are views showing still another examples of shapes of resistance portions against the induced current according to the invention.

Figure 10:
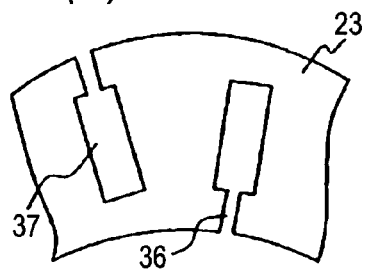
FIG. 10 illustrates explanatory views of examples of shapes of slits.
Figure 10:
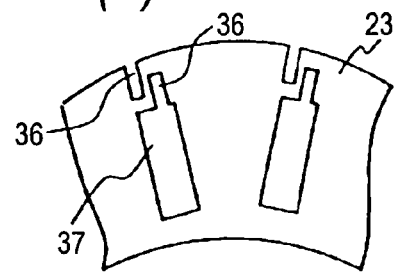
Figure 10:
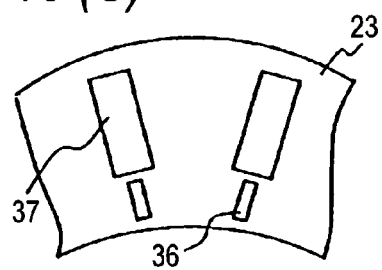
Figure 10:
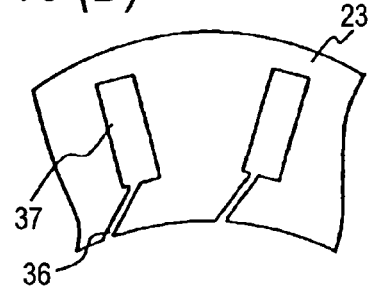
Figure 10:
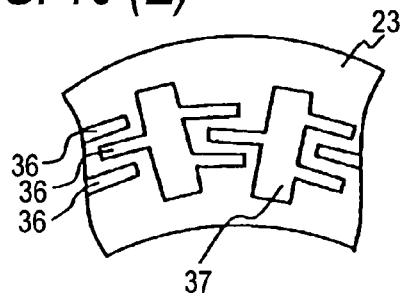
Figure 10:
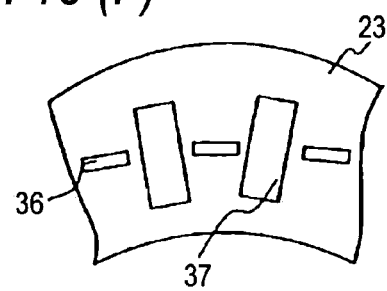
Figure 10:
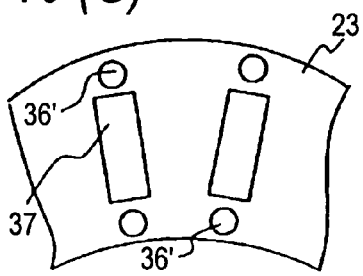

FIG. 10(A) is formed with the slits 36 alternately on the inner peripheral side and the outer peripheral side of the press fit holes 37. The slits 36 may not alternately be provided at every inner peripheral side and outer peripheral side of the press fit holes 37 but at every plural pieces thereof.

FIG. 10(B) is formed with two of the slits 36 from a reverse direction on the outer peripheral side (or inner peripheral side). By aligning two (or more) of the slits in a labyrinth shape in a state in which end portions of the slits on one side are not opened but closed to be continuous in this way, similar to the example of FIG. 8, not only the strength of the yoke is maintained but also the resistance against the induced current is increased and the effect of reducing the induced current is increased.

In FIG. 10(C), both end portions of the slits 36 in the radial direction are not opened but closed to connect. That is, in the example of FIG. 8, also with regard to the outer peripheral edge side of the yoke 23, the end portions of the slits 36 are made to be continuous similar to those on the inner peripheral side.

In FIG. 10(D), the slit 36 in the radial direction is inclined in a skewed direction. The slit 36 may be bent.

In FIG. 10(E), between the press fit holes 37 contiguous to each other, the plurality (three in this example) of the slits 36 are provided in the circumferential direction in a labyrinth shape similar to FIG. 10(B).

In FIG. 10(F), between the press fit holes 37 contiguous to each other, the slit 36 which is made to be continuous by closing both ends thereof similar to FIG. 10(C) are provided in the circumferential direction.

In FIG. 10(G), a resistance portion against the induced current is constituted by forming holes 36', in a circular shape in place of the slits 36 on the inner peripheral side and the outer peripheral side of the press fit hole 37. The shape, a position and a number of the resistance portions (holes 36') are not limited to those of the example of the drawing.

FIG. 11 is an exploded view of the stator according to the invention.

According to the example, the stator according to the embodiment of FIG. 5 is shown. The stator yoke 23 formed with the slit 36 on the outer peripheral side of the teeth press fit hole 37 is the laminated member of the plate members 123 for the yoke formed of steel plates. The tooth 24 which is the laminated member of the plate members 124 for the teeth formed of steel plates is inserted into the stator yoke 23 by passing a bobbin (insulator) 38 made of an insulating member and a bobbin flange 39 which are mounted at a position of each teeth press fit hole 37 of the stator yoke 23. The tooth 24 is fixedly held by press-fitting the press fit portion 24a at a lower end thereof into the teeth press fit hole 37. The coil 25 is wound around the tooth 24 via the bobbin 38.

Figure 12:
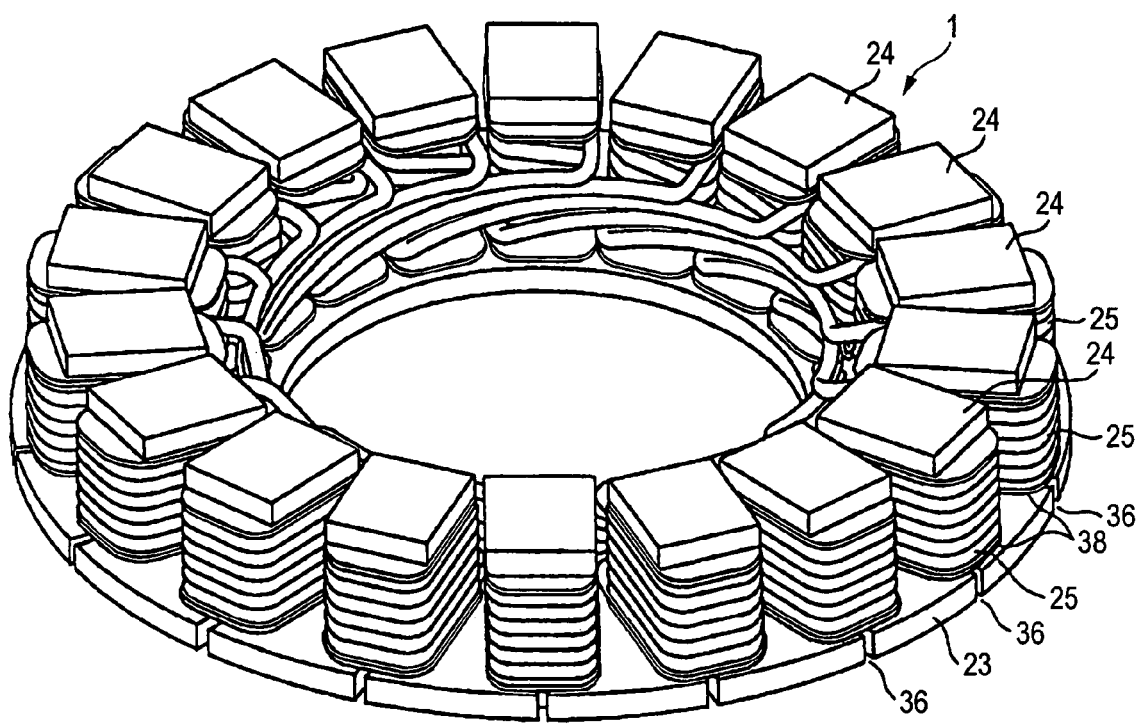
FIG. 12 is a whole perspective view of the stator of FIG. 11.

FIG. 12 is a whole perspective view of the stator according to the invention.

As shown in FIG. 11, mentioned above, the teeth 24 wound with the coils 25 via the bobbins 38 are aligned radially above the ring-like stator yoke 23 and press-fitted to be fixedly held. Thereby, the stator 1 is formed. According to the example, the slit 36 is formed at the stator yoke 23 on the outer peripheral side of each tooth 24.

Figure 13:
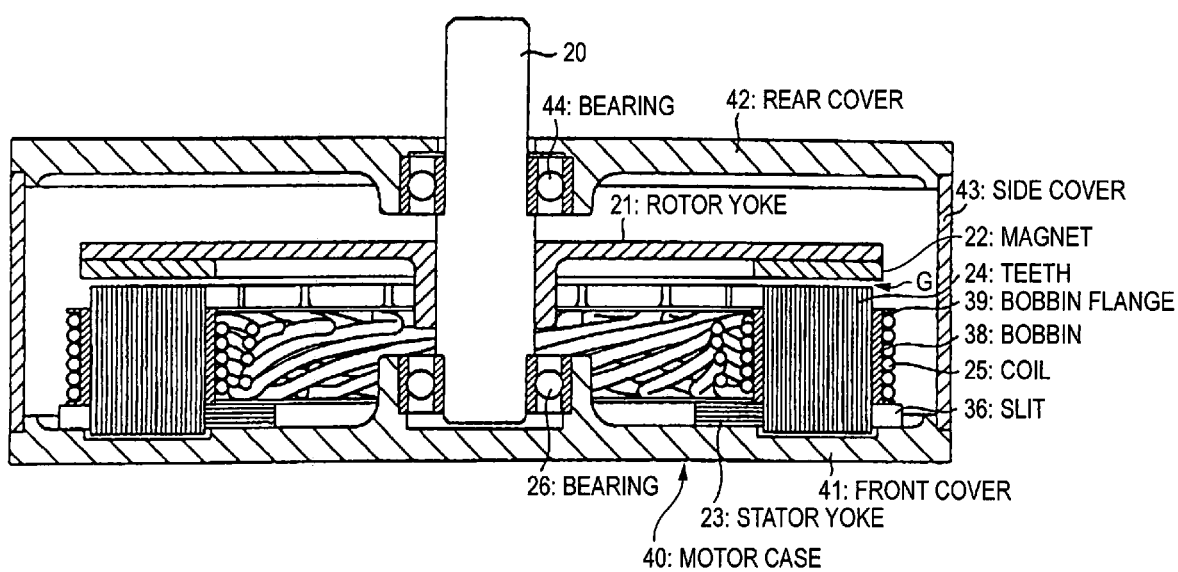
FIG. 13 is a whole sectional view of an electric motor integrated with the stator of FIG. 12.

FIG. 13 is a whole sectional view of an electric motor integrated with the stator of FIG. 12.

A motor case 40 surrounding the entire motor is constituted by a front cover 41 and a rear cover 42 in a circular plate shape and a side cover 43 in a cylindrical shape. The front cover 41 is fixed with the stator yoke 23 formed with the above-described slit 36 of the invention. An end portion of the rotor shaft 20 is rotatably mounted to the front cover 41 via the bearing 26. The vicinity of the outer end portion of the rotor shaft 20 is rotatably supported by the rear cover 42 via a bearing 44. The rotor yoke 21 is fixed to the rotor shaft 20. The rotor yoke 21 is fixed with the magnet 22. The teeth 24 press-fit to the stator yoke 23 is arranged to be opposed to the magnet 22 via a predetermined gap G therebetween.

Figure 14:
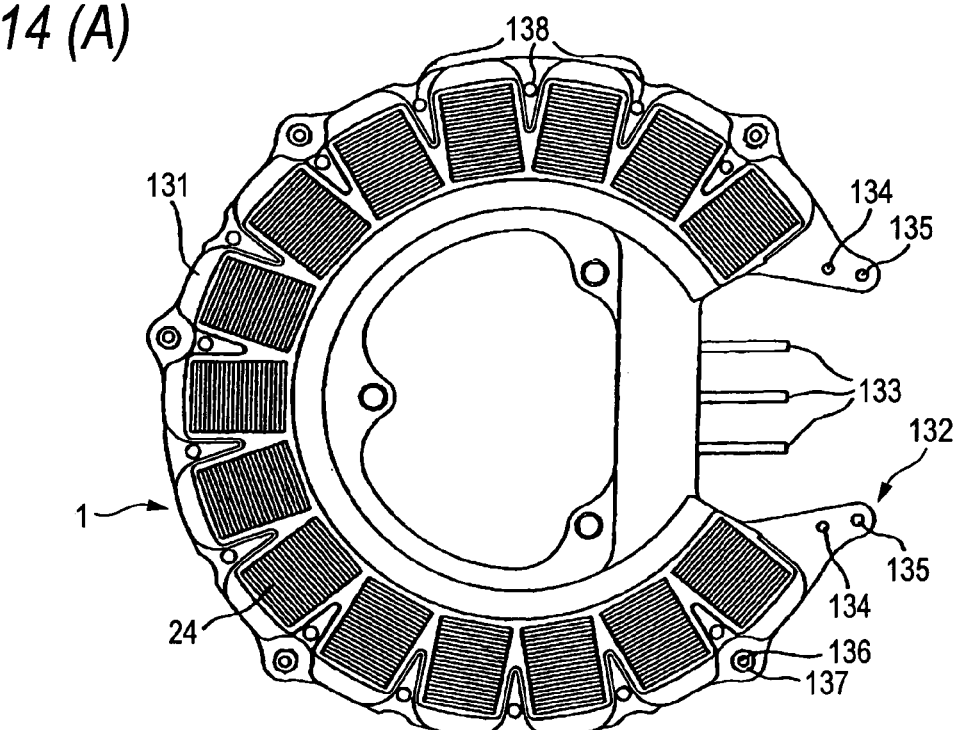
FIG. 14 illustrates explanatory views of an embodiment of the invention sealed by a resin mold.
Figure 14:
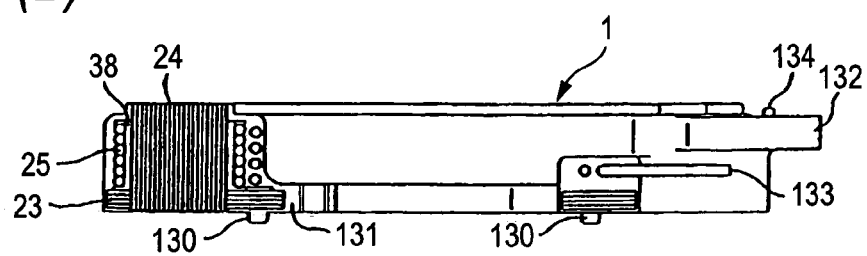

FIG. 14 shows the stator sealed by a resin mold. FIG. 14(A) is a plane view and FIG. 14(B) is a sectional view.

The yoke 23 is mounted with the plurality of teeth 24 in a ring-like shape and each tooth 24 is wound with the coil 25 via the bobbin 38. Substantially the whole stator 1 having the yoke 23 and the teeth 24 in this way is molded and sealed by a resin member 131. A lower face side and a base plate attaching portion 132 of the resin mold member are formed with positioning bosses 130, 134. Numeral 135 designates a screw hole for attaching the base plate. A peripheral edge portion of the resin mold member is formed with an attaching hole 136 and mounted with a collar 137.

By sealing the stator 1 by the resin mold in this way, the teeth 24 mounted with the coil or the like is firmly held fixedly by the yoke 23. Further, when the above-described various slits 36 or the like are formed in order to reduce the induced current, the yoke is liable to be deformed in press-fitting the teeth, however, even when the yoke is deformed, when the yoke is subjected to molding, the yoke can be set in a state of being corrected by a die and the stator can be molded in an undeformed shape having high dimensional accuracy.

When the deformation is corrected in this way, a mark 138 of a hold pin provided at the die for correcting the yoke is formed at the mold member of the resin mold 131. In this example, the mark 138 of the hold pin is formed on the yoke between the respective teeth 23, the portion is not provided with the resin and a surface of the yoke is exposed. The marks 138 of the hold pins are also formed on a rear face side of the stator 1.

Figure 15:
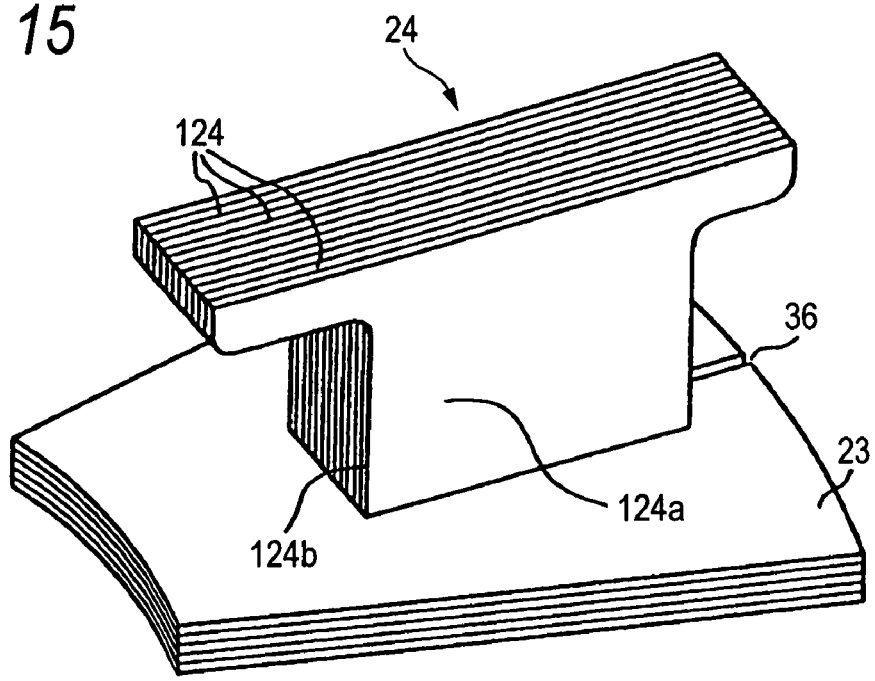
FIG. 15 is a perspective view of another embodiment of the invention.

FIG. 15 is a perspective view of teeth according to another embodiment of the invention.

According to the embodiment, a laminating direction of the tooth 24 is changed. That is, according to the example of FIG. 15, the plate face 124a (refer to both front and rear faces with respect to each sheet of the plate member 124) constituting the face to be superposed of the respective plate members 124 for the teeth constituting the teeth 24 of the laminated member is directed in the radial direction of the stator yoke 23. The side face 124b (the face showing the plate thickness of the steel plate) of the plate member 124 for the teeth is arranged in the circumferential direction of the stator yoke 23.

Even when the plate face 124a constituting the face to be superposed of the respective plate members 124 for the teeth is directed in the radial direction in this way, similar to the above-described example (FIG. 11) directing the plate face 124a in the circumferential direction, the effect of reducing the induced current by the slit 36 is sufficiently achieved.

Figure 16:
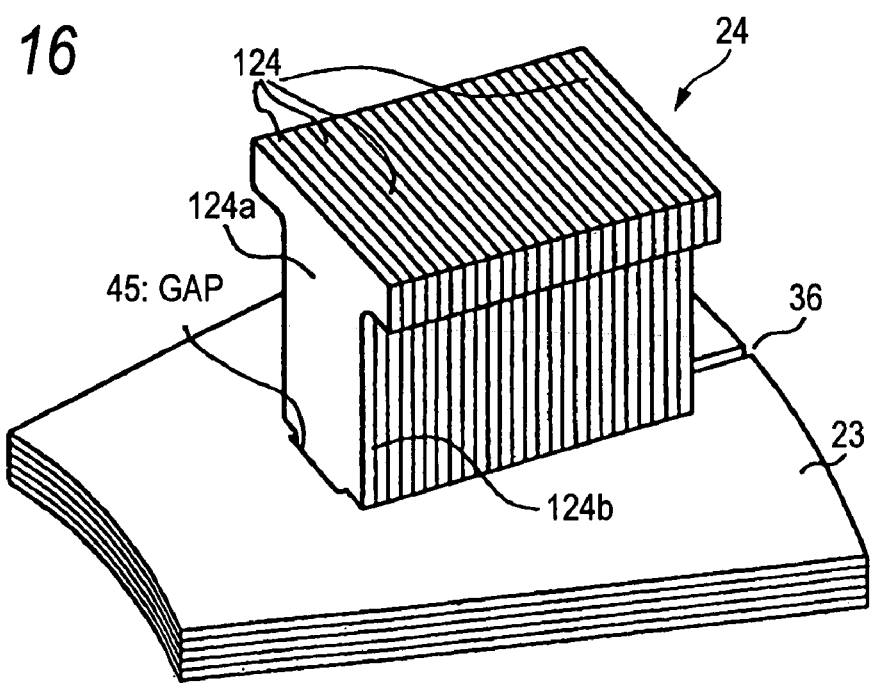
FIG. 16 is a perspective view of still another embodiment of the invention.

FIG. 16 is a perspective view of still another embodiment of the invention.

According to the embodiment, gaps 45 are provided at press fit portions on an inner peripheral side and an outer peripheral side (only the inner peripheral side is illustrated) of the tooth 24 press-fitted to the stator yoke 23. Further, according to the example, with regard to a section in a rectangular shape of the press fit portion of the tooth 24, a long side thereof is directed in the radial direction and a short side thereof is directed in the circumferential direction. In this case, the plate face 124a constituting the face to be superposed of the plate member 124 for the teeth is arranged on the side of the short side and the side face 124b (face showing the plate thickness) of the plate member 124 for the teeth is arranged on the side of the long side. Therefore, the gap 45 is formed on the side of the plate face 124a constituting the face to be superposed of the teeth 24 and on the side of the short side of the rectangular shape. The gap 45 is formed by notching the teeth press fit hole 37 provided at the yoke 23.

By the gap 45, the magnetic flux passing the plate face 124a on the side of the short side arranged in the circumferential direction is reduced, the induced current based on the magnetic flux is reduced and the energy loss is further alleviated. Further, by arranging the side face 124b of each plate members 124 on the side of the long side, the large induced current generated on the side of the long side can effectively be reduced by a resistance of the boundary faces of the laminated layers.

INDUSTRIAL APPLICABILITY

As has been described above, according to the invention, in the case of the induced current generated in the eddy shape at the surrounding of the teeth at inside of the stator yoke based on the change in the magnetic flux passing the teeth, the induced current can be blocked or reduced by forming the resistance portion against the induced current by forming the slit by, for example, cutting the yoke at the surrounding of the teeth. Therefore, the energy loss is reduced and the high motor efficiency can be achieved.

Therefore, by using the axial gap rotating electric machine as a drive source of an electric two-wheeled vehicle having a high torque using a strong magnet as an example of applying the invention, the motor efficiency can be increased by restraining the energy loss by restraining the induced current, the battery running distance can be prolonged and overheating can be restrained. Further, since thin formation in the axial direction is achieved, when attached to the axle, the axial gap type rotating electric machine can compactly mounted in the vehicle width direction and a large output is provided by the compact shape.

The invention claimed is:

1. An axial gap type rotating electric machine, comprising:
    a yoke on a side of a rotor in a circular plate shape fixed to a rotating shaft;
    a yoke on a side of a stator in a circular plate shape opposed to the yoke on the side of the rotor;
    a magnet fixed to a side of an opposed face of either one of the yokes on the side of the rotor or the side of the stator;
    a plurality of teeth arranged on a side of an opposed face of other yoke on the side of the rotor or the side of the stator radially and opposedly to the magnet, wherein each of the plurality of teeth is formed by laminating a plurality of plate members; and
    a coil wound around each of the plurality of teeth;

wherein the yoke comprises a fixing portion including a hole or a recess for inserting a portion of the teeth to fix, wherein plate surfaces of the plate members are perpendicular to a surface of the yoke having the fixing portion; and wherein a resistance portion to block induced current is formed as a slit in the yoke extending from the fixing portion to a peripheral side of the yoke.

2. The axial gap type rotating electric machine according to claim 1, wherein the fixing portion and the slit penetrate completely through the yoke.

3. The axial gap type rotating electric machine according to claim 1, wherein the fixing portion penetrates completely through the yoke and the slit penetrates only partially through the yoke to a middle portion.

4. The axial gap type rotating electric machine according to claim 1, wherein the fixing portion penetrates only partially through the yoke to a middle portion and the slit penetrates completely through the yoke.

5. The axial gap type rotating electric machine according to claim 1, characterized in that the resistance portion is formed on an inner peripheral side or an outer peripheral side of the fixing portion.

6. The axial gap type rotating electric machine according to claim 5, wherein the slit extends from the outer peripheral side of the fixing portion and opens to an outer peripheral side of the yoke.

7. The axial gap type rotating electric machine according to claim 5, wherein the slit extends from the inner peripheral side of the fixing portion and opens to an inner peripheral side of the yoke.

8. The axial gap type rotating electric machine according to claim 5, wherein some slits extend from the inner peripheral side of the fixing portions for some teeth and open to an inner peripheral side of the yoke, and other slits extend from the outer peripheral portion of the fixing portions for other teeth and open to an outer peripheral side of the yoke.

9. The axial gap type rotating electric machine according to claim 5, wherein the slit extends from the fixing portion in a direction that is inclined or skewed relative to a radial direction.

10. The axial gap type rotating electric machine according to claim 1, characterized in that the resistance portion is formed by a space portion provided at the yoke or cutting the yoke.

11. The axial gap type rotating electric machine according to claim 1, characterized in that the resistance portion is formed by a member made of a material that is different from a material of the yoke.

12. The axial gap type rotating electric machine according to claim 1, characterized in that the yoke fixed with the teeth is sealed by a resin mold.

13. An electric two-wheeled vehicle characterized in that an axial gap type electric machine according to any one of claims 1-5 or 12 is used as a drive source.

14. An axial gap type rotating electric machine, comprising:
a yoke on a side of a rotor in a circular plate shape fixed to a rotating shaft;
a yoke on a side of a stator in a circular plate shape opposed to the yoke on the side of the rotor;
a magnet fixed to a side of an opposed face of either one of the yokes on the side of the rotor or the side of the stator;
a plurality of teeth arranged on a side of an opposed face of other yoke on the side of the rotor or the side of the stator radially and opposedly to the magnet, wherein each of the plurality of teeth is formed by laminating a plurality of plate members; and
a coil wound around each of the plurality of teeth;
wherein the yoke comprises a plurality of fixing portions including a hole or a recess for inserting a portion of the teeth to fix, wherein plate surfaces of the plate members are perpendicular to a surface of the yoke having the fixing portion; and
wherein a resistance portion to block induced current is formed as a slit extending circumferentially between and connecting at least two of the fixing portions.

15. The axial gap type rotating electric machine according to claim 14, wherein two slits extend circumferentially between and connect a group of three fixing portions.

16. The axial gap type rotating electric machine according to claim 15, wherein there are plural groups of three fixing portions, each having two slits extending circumferentially and connecting therebetween.

* * * * *